(12) United States Patent  (10) Patent No.: US 8,521,842 B2
Hays et al.  (45) Date of Patent: Aug. 27, 2013

(54) DELIVERING COMPOSITE MEDIA TO A CLIENT APPLICATION

(75) Inventors: Katherine Hays, Boston, MA (US); Charlotte-Anne Nelson, New York, NY (US); Eunice Chou, New York, NY (US); Michael Novi, Brooklyn, NY (US); Jeffrey D. Carnahan, New York, NY (US)

(73) Assignee: Microsoft Corporation, Redmond, WA (US)

( * ) Notice: Subject to any disclaimer, the term of this patent is extended or adjusted under 35 U.S.C. 154(b) by 1150 days.

(21) Appl. No.: 12/040,620

(22) Filed: Feb. 29, 2008

(65) Prior Publication Data

US 2009/0222511 A1  Sep. 3, 2009

(51) Int. Cl.
  *G06F 15/16* (2006.01)
(52) U.S. Cl.
  USPC ............ 709/219; 709/203; 709/217; 380/200
(58) Field of Classification Search
  USPC .......................... 709/219, 203, 217; 380/200
  See application file for complete search history.

(56) References Cited

U.S. PATENT DOCUMENTS

| 6,192,363 | B1 | 2/2001 | Yasumura | |
| 6,616,533 | B1 * | 9/2003 | Rashkovskiy | .................. 463/31 |
| 6,816,883 | B2 | 11/2004 | Baumeister | |
| 7,290,057 | B2 | 10/2007 | Saunders | |
| 2002/0194070 | A1 * | 12/2002 | Totham et al. | .................. 705/14 |
| 2003/0070167 | A1 | 4/2003 | Holtz | |
| 2004/0015608 | A1 * | 1/2004 | Ellis et al. | ..................... 709/246 |
| 2004/0148221 | A1 * | 7/2004 | Chu | ............................... 705/14 |

(Continued)

FOREIGN PATENT DOCUMENTS

CN  1761335 A  4/2006

OTHER PUBLICATIONS

Harville, Michael, et al., An Architecture for componentized, network-based media services http://www.hpl.hp.com/techreports/2003/HPL-2003-185.PDF.

(Continued)

*Primary Examiner* — April Y Blair
(74) *Attorney, Agent, or Firm* — Shook, Hardy & Bacon LLP (57) ABSTRACT

An approach is provided for generating composite media and delivering the composite media to a client application. Data is received from one or more external sources, and a portion of the data is selected to be used in the composite media according to the time period of delivery of the client application, user information, or the type of client application requesting the media, if a request has been made. The selected data is integrated into a pre-created template to generate the composite media, such as an advertisement, special offers, or weather and stock information. The composite media may be modified prior to being delivered to the client application. The selection of the pre-created template and the modification of the composite media are made according to requirements of the client application, user information, or the type of client application (e.g., gaming application) requesting the media.

20 Claims, 5 Drawing Sheets

(56) References Cited

U.S. PATENT DOCUMENTS

| | | |
|---|---|---|
| 2004/0177117 A1 | 9/2004 | Huang |
| 2004/0210602 A1 | 10/2004 | Hillis |
| 2006/0026067 A1* | 2/2006 | Nicholas et al. ............... 705/14 |
| 2006/0128469 A1* | 6/2006 | Willis et al. ..................... 463/42 |
| 2006/0150088 A1 | 7/2006 | Kraft |
| 2007/0002045 A1 | 1/2007 | Finger |
| 2007/0016657 A1 | 1/2007 | Ito |
| 2007/0216761 A1 | 9/2007 | Gronner et al. |
| 2007/0220587 A1 | 9/2007 | Loyer |
| 2008/0004097 A1* | 1/2008 | Maya et al. ..................... 463/16 |
| 2008/0102947 A1* | 5/2008 | Hays et al. ...................... 463/31 |

OTHER PUBLICATIONS

Birkmaier, Craig, A Visual Compositing Syntax for Ancillary Data Broadcasting http://www.pcube.com/pdf/databcst.pdf.

Hudson, Alan D., et al., The Interoperable Media Player Toolkit (IMP) https://www.movesinstitute.org/xmsf/workshop/hudson/Yumetech-XMSFwhitepaper.pdf.

PCT Application No. PCT/US2009/031961; Applicant: Microsoft Corporation; Filed: Jan. 26, 2009; PCT Notification of Transmittal of International Search Report and the Written Opinion of the International Searching Authority, or the Declaration, mailed Sep. 14, 2009.

* cited by examiner

DELIVERING COMPOSITE MEDIA TO A CLIENT APPLICATION

BACKGROUND

Delivering advertisements to web-based applications is a common method for companies to catch the attention of web users. In addition to advertisements, companies, typically Internet companies, also provide users with other types of information, such as weather conditions for where a particular user is located. Together, this type of content is typically delivered to the Internet company, and thus to the user, in an as-is format. The content, which consists of the information integrated into a template, can be assembled ahead of time, and thus may be static, so as to not provide the user with up-to-date or real-time information. In addition, this content is typically very limited in scope, and does not provide the user with a variety of information.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to delivering composite media to a client application. Real-time or near real-time data from one or more external sources may be received, and based on the type of data, a pre-created template may be selected. The data is integrated into the pre-created template to generate a composite media. The composite media may then be delivered to the client application for display. In accordance with some embodiments, the composite media is generated in response to a request for media. In some embodiments, the composite media is generated prior to a request for media, and the type of composite media selected may be based on requirements received with the request for media.

BRIEF DESCRIPTION OF THE DRAWINGS

Embodiments of the present invention are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention relates to methods for delivering composite media to a client application. Data may be received from external sources, and a portion of the data is selected to be integrated into a selected, pre-created template to generate a composite media. The composite media may the be delivered to the client application.

Embodiments of the present invention relate to delivering composite media to a client application. Data from one or more external sources may be received. Once the data is received, a portion of the data is selected based on one or more supplied factors, such as, but not limited to the expected time period of delivery of the composite media, user information, and the type of client application. One or more pre-created templates are selected according to one or more of a number of factors, such as, but not limited to where the composite media will be placed in the client application, the type of client application, some type of information about the user, and the type of data selected. The portion of the data is integrated into the one ore more templates to generate the composite media, and the composite media may then be delivered to the client application.

In some embodiments, data from at least one external source is received, and several subsets of data are selected from the data received from the external sources. A request, along with requirements, is made for some type of media to be displayed in the gaming application. Next, pre-created templates are selected based on the types of data subsets selected. The data subsets are integrated into the pre-created templates to generate several composite media. A request may then be received for media to be displayed in the gaming application. This request may include one ore more requirements, which are used as the basis for selecting which composite media are delivered to the gaming application that requested the media.

In other embodiments, the gaming application requests for media to be displayed in the gaming application. The request may include requirements such as the size and type of the requested media, and the type of gaming application requesting the media. Data is received from one or more external sources and a portion of the data is selected according to factors such as, but not limited to the time period of expected delivery of the composite media to the gaming application, some type of user information, and the type of gaming application requesting the media. A pre-created template is then selected according to one of a number of factors, such as, one or more of the requirements received with the request for media, some type of user information, and the type of data selected for integration into the pre-selected template. The data is integrated into the pre-created template to generate a composite media. The composite media may be modified according to one of a number of factors, such as user information, requirements of the gaming application, or the type of data that was integrated into the pre-created template. The composite media is then delivered to the gaming application.

Having briefly described an overview of the present invention, an exemplary operating environment for the present invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

Figure 1:
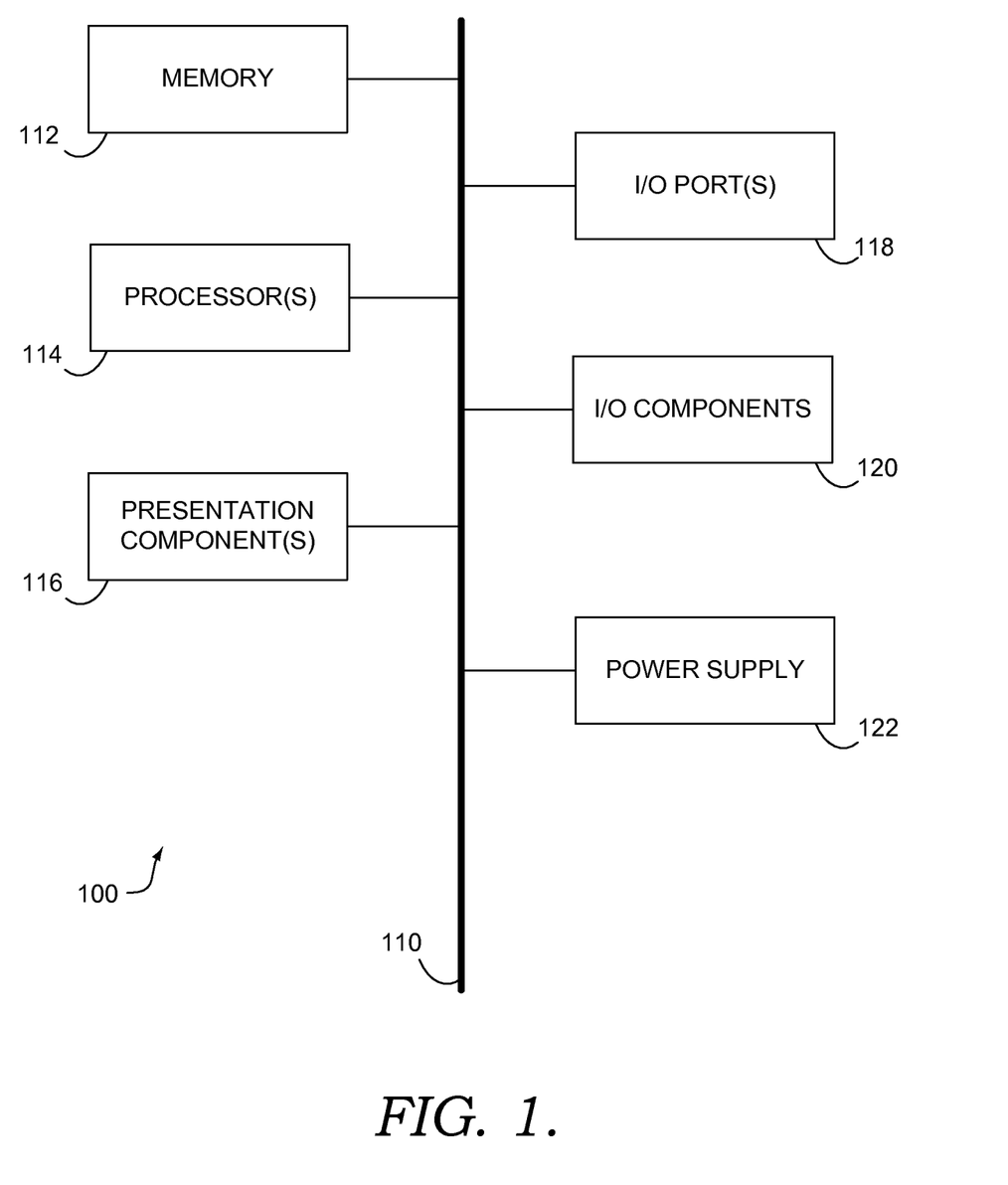
FIG. 1 is a block diagram of an exemplary computing environment suitable for use in implementing the present invention.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computer 110 typically includes a variety of computer-readable media. Computer-readable media can be any available media that can be accessed by computer 110 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display, speaker, printing component, vibrating component, etc.

I/O ports 118 allow computing device 100 to be logically coupled to other devices, including I/O components 120, some of which may be built in. Illustrative components include a microphone, joystick, game pad, satellite dish, scanner, printer, wireless device, etc.

Figure 2:
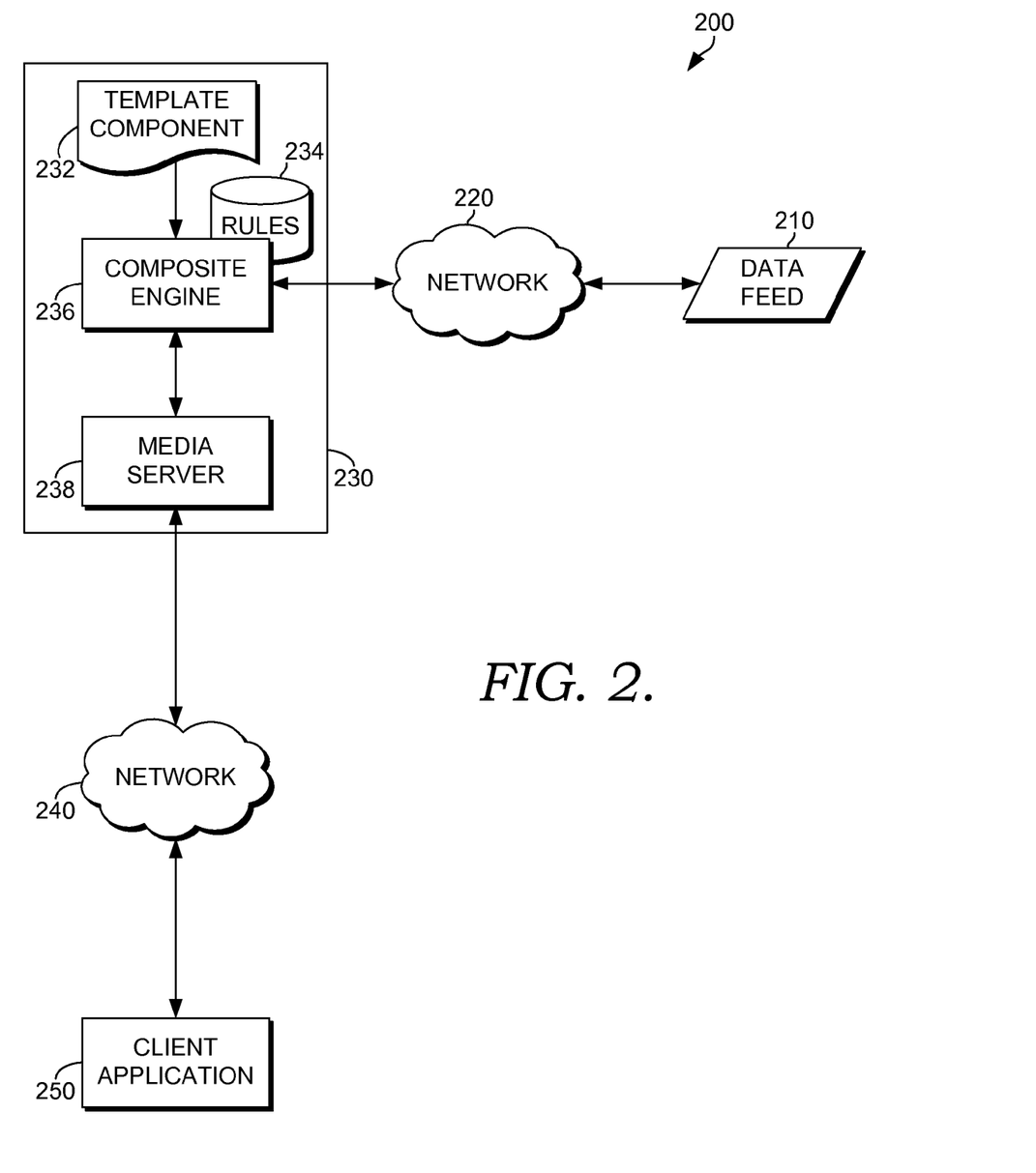
FIG. 2 is a block diagram of an exemplary system for delivering composite media to a client application, in accordance with an embodiment of the present invention.

As previously mentioned, embodiments of the present invention relate to delivering composite media to gaming applications and other types of client applications. FIG. 2 illustrates a block diagram of an exemplary system 200 for delivering composite media to a client application, in accordance with an embodiment of the present invention. Item 210 shows that data may be fed from one or more external sources through a network, item 220, to a composite media generator, as shown as item 230. The composite media generator 230 is comprised of several components, including a template component 232, a rules component 234, a composite engine 236, and a media server 238. The templates are created prior to the time when the data is received, and may be created and stored within the template component 232. The rules component 234 determines which subsets or portions of data are selected, and which template(s) the data will be integrated into to generate the composite media. In some embodiments, the rules component 234 may manipulate, select, composite, or expand the external data. For instance, this may be necessary to better match the data to the selected template. The rules component 234 may also make any necessary changes to the template(s) to better match the template(s) to the data. For instance, there may be a template that can show either a sun or a cloud, depending on the incoming weather feed. In this instance, the rules component 234 may alter the template to display a sun if the weather feed provided for sunny conditions. The composite engine 236 integrates the selected portion or subset of data into the selected template(s) to generate the composite media. The media server, item 238, in some embodiments, may make the request for media to be delivered to the client application. The client application, item 250, in other embodiments, may request the media through a network, such as item 240. Along with the request for media, the client application 250 may also send requirements for the media, such as the required size of the media, the placement of the media in the client application, the desired type of media, and the type of client application that is requesting the media.

Figure 3:
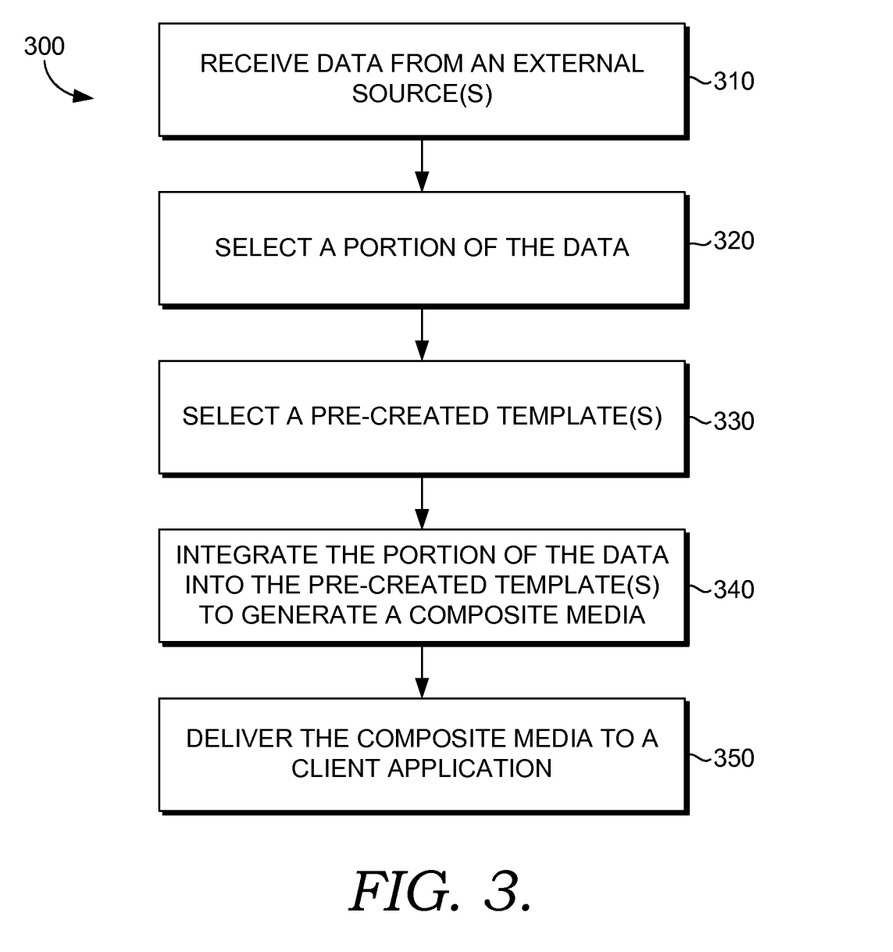
FIG. 3 is a flow diagram of a method for delivering composite media to a client application, in accordance with an embodiment of the present invention.

Referring to FIG. 3, a flow diagram is illustrated that shows a method 300 for delivering composite media to a client application. Initially, data is received from at least one external source as shown at block 310. The data may be any type of information, such as, but not limited to advertisements, coupon codes, weather feeds, currently running movies and movie times, stock quotes, train schedules, news events, sports scores, amber alerts, offers unique to a particular user, and the like. The data is received from any external source or third party, such as an advertiser in the case of the data being an advertisement, special offer, or coupon code. In one embodiment, the data is a news event, and the external source is a local or national television station. In another embodiment, the data is an amber alert, and the external source is the local police or sheriff's department that issues the amber alerts. The data feed may be any type, such as, but not limited to RSS-style feed, stock feed, XML exchange, response to a web-service request, or any other structured data exchange. In addition, the data may be in any form. For instance, the data may be text, video, audio, images, or another media component.

At block 320, at least a portion of the data that has been received at block 310 is selected for use in generating the composite media. The portion of the data may be selected according to one or more of a number of factors, such as, but not limited to a time period of delivery of the composite media to the client application, some type of user information, or the type of client application that will be receiving the composite media. The time period of delivery may be one or more of the time of day, day, week, month, etc. For instance, an advertiser may wish to advertise a particular product at a certain time of day, or a certain time of month in order to reap the most benefit out of the advertisement. In another instance, it may be determined that displaying stock quotes is most appropriate and beneficial to a user if displayed during daytime hours. In yet another instance, it may be determined that displaying amber alerts in client applications typically used or viewed by adult users is most beneficial, and therefore client applications typically used by young children do not receive amber alerts for display in the client application.

In addition, the selected portion of the data may be limited, manipulated, or expanded as necessary. For instance, if a portion of the data selected is inappropriate for a user in a particular age group, that portion may not be included in the composite media. Along the same lines, a word or words may be altered or modified as deemed appropriate or according to the user's age group.

Next, at least one pre-created template is selected at block 330. The templates are pre-created and may correspond with the type of data received from the external sources. The templates may be selected according to one of many factors. In one embodiment, a template is chosen according to where the composite media will be located within the client application. In another embodiment, a template is chosen according to the type of client application that will be receiving the composite media. For instance, if the type of client application is a gaming application, a template may be chosen that corresponds to the type of game. In yet another embodiment, a template is selected according to some type of user information, such as the user's location, interests, age, gender, etc. In still another embodiment, a template is selected according to the type of data received from the external sources. For instance, if the type of data received is weather data, a template may be selected that is most appropriate for weather information, such as a template displaying a sun, or a template displaying an image of rain.

The portion of the data that is selected is integrated into the one or more selected pre-created templates at block 340, and a composite media is generated. For instance, a RSS feed of a news story may be integrated into a newspaper template to display an image similar to that of a newspaper. In another instance, movie times may be integrated into a movie advertisement or a movie trailer, both of which may be pre-created templates. After the composite media is generated, it is delivered to the client application, as shown at block 350.

In one embodiment of FIG. 3, a request is received for media to be displayed in the client application. The request may be received prior to the generation of the composite media. In this on-demand method, the data is generally more up-to-date, and it is received, integrated into the one or more pre-created templates, and delivered to the client application in real-time or near real-time. The request may, in some instances, include customization requirements, such as the size of the media requested, and where the media will be placed within the client application. In the alternative, the request may be received after the generation of the composite media. This pre-processed method entails the data being integrated into the one or more pre-created templates on a periodic basis, or as new data is provided, so that when the request is made for media, the composite media has already been generated and is ready for delivery to the client application.

In a further embodiment of FIG. 3, the composite media is modified prior to being delivered to the client application. The composite media may be modified according to a requirement of the client application, such as a specified size of the composite media, or a specified placement of the composite media within the client application. For instance, in a gaming application, such as a basketball game, composite media may be placed on a jumbotron. The lettering and graphics of the composite media must be a certain size so that the game users are able to read the composite media, whether it is an advertisement or current weather information.

Figure 4:
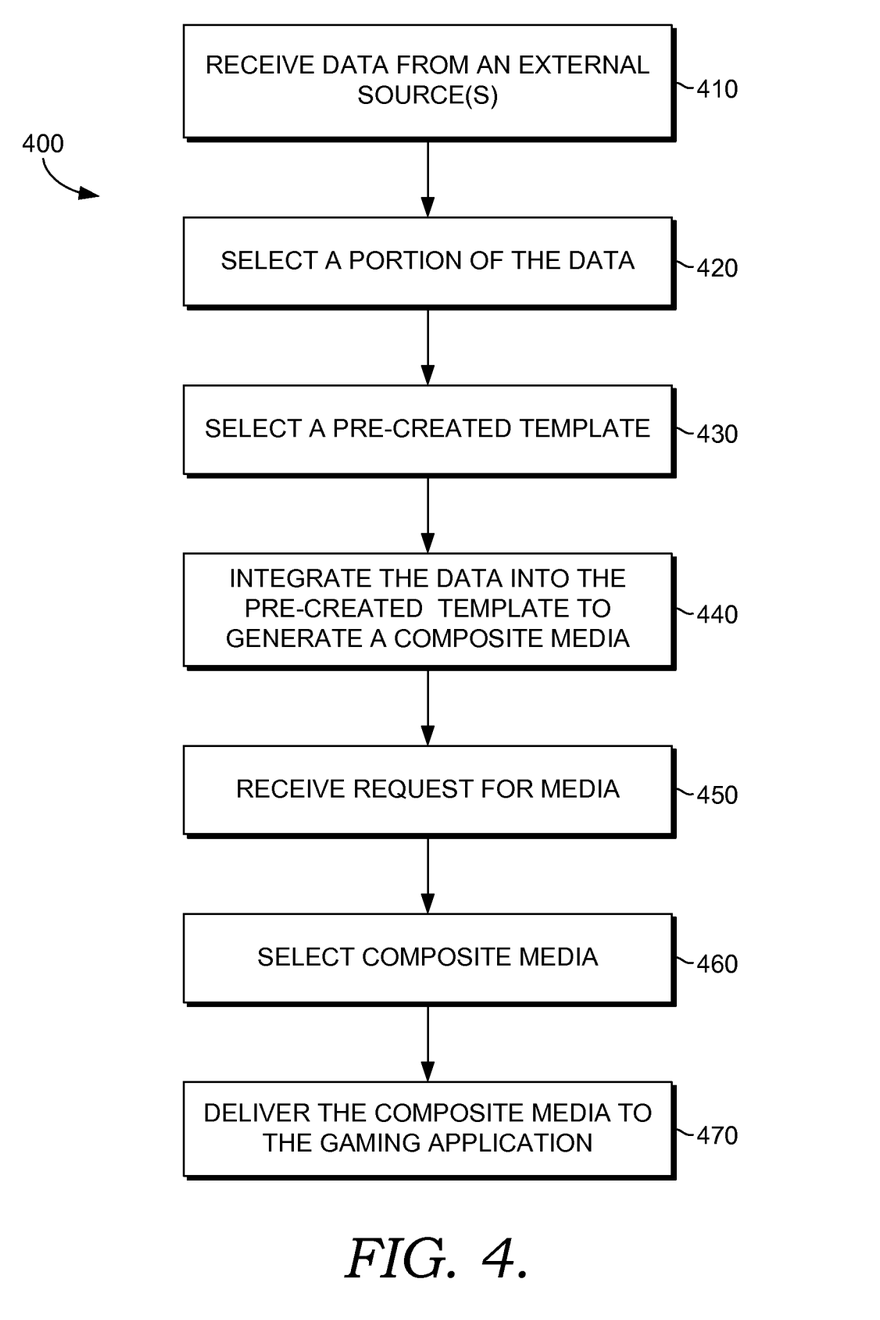
FIG. 4 is a flow diagram of a method for delivering composite media to a gaming application, in accordance with another embodiment of the present invention.

Turning now to FIG. 4, a flow diagram is illustrated showing a method 400 for delivering composite media to a gaming application. Initially, data is received from one or more external sources, as shown at block 410. The data may be in any format, such as, but not limited to an RSS-style feed, stock feed, XML exchange, or response to a web-service request, and may come from any third party external source, such as a news feed from a newspaper or television station, or currently playing movies and movie times from a local movie theater. Next, at block 420, several data subsets are selected from the plurality of data received at block 410. The data subsets may be selected according one or more of a number of factors, such as, but not limited to the availability of certain types of data at the time the data subsets are selected. Next, several pre-created templates are selected at block 430, and this selection may be based on any number of factors, such as the type of data subsets that were selected at block 420. In one instance, a data subset is a weather feed for a particular day and a particular location. In this instance, the pre-created template that is selected may display a sun or an image of rain or snow, depending on the content of the weather feed. In another instance, a data subset is an Amber Alert and in this instance, the pre-created template that is selected is an image that includes the phone number to call if the child in the Amber Alert is spotted. The data subsets are then integrated into the selected pre-created templates, as shown at block 440, and composite media is generated. In most instances, more than one composite media is generated at block 440.

With continued reference to FIG. 4, as indicated at block 450, a request is received for media. This request may come from the gaming application, the server, or the like. As would be understood to one skilled in the art, in this embodiment, the request is received after the composite media is generated. The request may contain one or more requirements, such as the desired size of the media to be delivered to the gaming application. At block 460, at least one composite media is selected for delivery to the gaming application according to the requirements received along with the request for media. In one instance, only one composite media is requested but in another instance, several composite media may be requested.

In one embodiment, the composite media may be modified according to the requirements received. For instance, if the requirements specify one or more characteristics of the user, the composite media may be modified based on this information, such as modifying the colors, specific words used, or graphics of the composite media based on the user's gender or age. In another instance, the composite media may be modified based on a characteristic of the gaming application, such as the specific type of gaming application requesting the media. In this instance, if the gaming application is a race car game and the composite media is an advertisement, the composite media may be modified to look similar to actual advertisements used in actual racing environments. The composite media is delivered to the gaming application at block 470.

Figure 5:
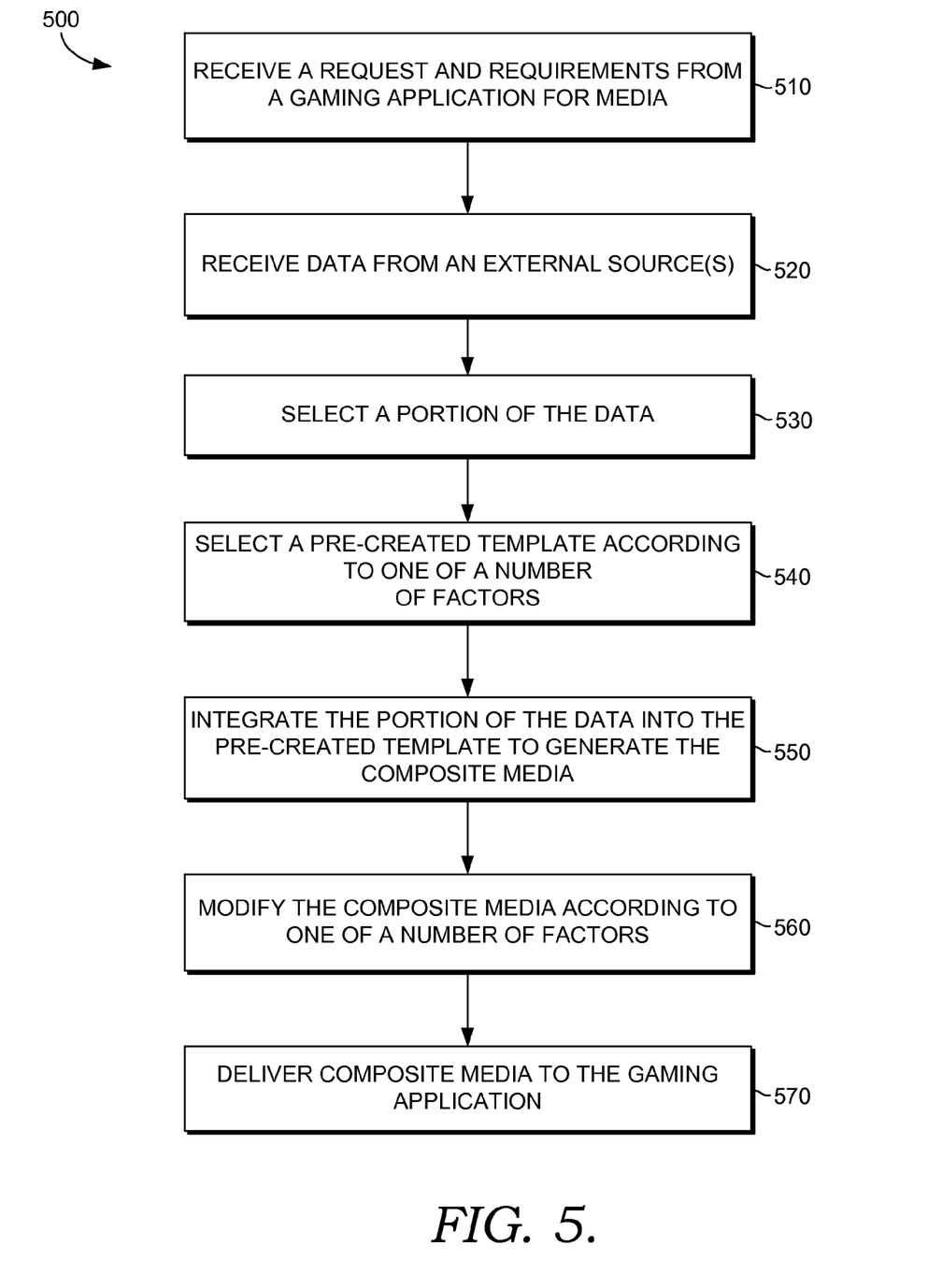
FIG. 5 is a flow diagram of a method for delivering composite media to a gaming application, in accordance with another embodiment of the present invention.

With reference to FIG. 5, a flow diagram is illustrated showing a method 500 for delivering composite media to a gaming application. At block 510, a request is received from the gaming application for media to be displayed in the gaming application. The request may comprise one or more requirements, such as, but not limited to a requested size of the media, a requested type of media (e.g., advertisement, weather feed, game scores), and the type of gaming application that is requesting the media for display in the gaming application. Data from one or more external sources is received at block 520, and as described above in regard to FIG. 3 at block 310, the data can be in any format, such as, but not limited to an RSS-style feed, stock feed, XML exchange, or response to a web-service request, and may come from any third party external source, such as a news feed from a newspaper or television station, or currently playing movies and movie times from a local movie theater.

As indicated at block 530, a portion of the data received from the one or more external sources is selected for use in generating the composite media. As described above in regard to FIG. 4 at block 420, the selection of the portion of the data used to generate the composite media may be made according to one or more of a number of factors, such as, but not limited to the time period of delivery of the composite media, some type of user information that has been provided or that can be acquired, and the type of gaming application. The time period of delivery of the composite media may be the time of day, day, week, month, or year.

A pre-created template is selected according to one of a number of factors, and is shown at block 540. In one embodiment, a template is chosen according to where the composite media will be located within the client application. In another embodiment, a template is chosen according to the type of client application that will be receiving the composite media. In yet another embodiment, a template is selected according to some type of user information (e.g., the user's location, interests, age, gender). In still another embodiment, a template is selected according to the type of data received from the external sources. Once a template has been chosen at block 540, the selected portion of the data is integrated into the selected, pre-created template to generate the composite media, as indicated at block 550. Block 560 indicates that the composite media may be modified according to one of a number of factors. These factors may include one or more of the requirements given by the gaming application, some type of user information (e.g., age, gender, interests), and the type of gaming application that is requesting the media to be displayed in the gaming application. As described above, the requirements received from the gaming application may include, but are not limited to the requested size of the media and the requested type of media. The composite media is delivered to the gaming application at block 570.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the methods. It will be understood that certain features and sub-combinations are of utility and may be employed without reference to other features and sub-combinations. This is contemplated by and is within the scope of the claims.

What is claimed is:

1. A computer-implemented method for delivering composite media to a client application, the method comprising:
   receiving a plurality of data from at least one external source;
   selecting at least a portion of the plurality of data, wherein the at least a portion of the plurality of data is selected according to at least one of a time period of delivery of the composite media, user information, or a type of client application;
   selecting, by a computing device, at least one pre-created template from a plurality of templates, wherein each of the plurality of templates includes at least one image or text, and wherein the selected pre-created template is generated prior to receiving the plurality of data from the at least one external source and is selected based on the type of the plurality of data selected and one or more of:
      a placement of the at least one pre-created template that comprises the plurality of data selected in the client application, and
      a type of the client application;
   integrating the at least a portion of the plurality of data into the at least one pre-created template to generate the composite media; and
   delivering the composite media to the client application.

2. The computer-implemented method of claim 1, wherein the plurality of data from at least one external source is one of a RSS-style feed, a stock feed, or an XML exchange.

3. The computer-implemented method of claim 1, further comprising:
   receiving a request for media to be displayed in the client application.

4. The computer-implemented method of claim 3, wherein the request for media to be displayed in the client application comprises a plurality of requirements.

5. The computer-implemented method of claim 4, wherein the plurality of requirements comprises at least one of a requested size of the media to be displayed in the client application, and the placement of the media to be displayed in the client application.

6. The computer-implemented method of claim 5, further comprising:
   modifying the composite media according to the plurality of requirements.

7. The computer-implemented method of claim 3, wherein the at least a portion of the plurality of data is integrated into the at least one pre-created template to generate the composite media in response to the request for media to be displayed in the client application.

8. The computer-implemented method of claim 3, wherein the composite media is generated prior to receiving the request for media to be displayed in the client application.

9. The computer-implemented method of claim 1, wherein the client application is a gaming application.

10. The computer-implemented method of claim 1, wherein the plurality of data from the at least one external source is at least one of currently running movies and times for a particular movie theater, weather information, stock information, sports scores, train schedules, amber alerts, information in relation to a recent news event, advertisements, coupons, or offers unique to a particular user.

11. A computer-implemented method for delivering composite media to a gaming application, the method comprising:
receiving a plurality of data from at least one external source;
selecting a plurality of data subsets from the plurality of data;
selecting, by a computing device, a plurality of pre-created templates that each comprise at least one image or text and that were created prior to receiving the plurality of data such that the plurality of pre-created templates are stored separate from the plurality of data received from the at least one external source, wherein the plurality of pre-created templates are selected according to a type of the plurality of data subsets, a placement of the at least one pre-created template comprising the plurality of data selected that is integrated into the gaming application, and a type of the gaming application;
integrating each of the plurality of data subsets into one of the plurality of pre-created templates to generate a plurality of composite media;
receiving a request for media to be displayed in the gaming application, wherein the request comprises a plurality of requirements;
selecting at least one of the composite media according to the plurality of requirements; and
delivering the at least one of the composite media to the gaming application.

12. The computer-implemented method of claim 11, wherein the plurality of data from at least one external source is one of a RSS-style feed, a stock feed, or an XML exchange.

13. The computer-implemented method of claim 11, wherein the plurality of requirements comprises a requested size of the media to be displayed in the client application.

14. The computer-implemented method of claim 11, wherein the request for media is made by the gaming application.

15. The computer-implemented method of claim 11, wherein the plurality of data from the at least one external source is at least one of currently running movies and times for a particular movie theater, weather information, stock information, sports scores, train schedules, amber alerts, information in relation to a recent news event, advertisements, coupons, or offers unique to a particular user.

16. The computer-implemented method of claim 11, further comprising:
modifying the at least one of the composite media according to the plurality of requirements.

17. One or more computer storage devices having computer-executable instructions embodied thereon that, when executed by a computing device having a processor and a memory, perform a method for delivering composite media to a gaming application, the method comprising:
receiving a request from the gaming application for media to be displayed in the gaming application, wherein the request comprises a plurality of requirements, and wherein the plurality of requirements comprise at least one of a requested size of the media to be displayed in the gaming application, a requested type of media to be displayed in the gaming application, and a type of gaming application requesting the media to be displayed in the gaming application;
receiving a plurality of data from at least one external source;
selecting at least a portion of the plurality of data, wherein the at least a portion of the plurality of data is selected according to at least one of a time period of delivery of the composite media, user information and a type of gaming application;
selecting a pre-created template that comprises at least one image or text and that is created prior to receiving the request from the gaming application and prior to receiving the plurality of data such that the pre-created template is stored separate from the plurality of data, wherein the pre-created template is selected according to at least one of one or more of the plurality of requirements received from the gaming application, user information, and a type of the at least a portion of the plurality of data selected;
integrating the at least a portion of the plurality of data into the pre-created template to generate the composite media;
modifying the composite media, wherein the composite media is modified according to at least one of one or more of the plurality of requirements received from the gaming application, user information, and the type of gaming application; and
delivering the composite media to the gaming application.

18. The one or more computer storage devices of claim 17, wherein the plurality of data from at least one external source is one of a RSS-style feed, a stock feed, or an XML exchange.

19. The one or more computer storage devices of claim 17, wherein the plurality of data from the at least one external source is at least one of currently running movies and times for a particular movie theater, weather information, stock information, sports scores, train schedules, amber alerts, information in relation to a recent news event, advertisements, coupons, or offers unique to a particular user.

20. The one or more computer storage devices of claim 17, wherein the requested size of the media to be displayed in the gaming application is based on a display location of the media to be displayed in the gaming application.

* * * * *